(12) United States Patent
Cheng

(10) Patent No.: US 6,892,678 B2
(45) Date of Patent: May 17, 2005

(54) PET COLLAR

(75) Inventor: Vincent Cheng, Taichung (TW)

(73) Assignee: Pronix Industries Inc., Taichung (TW)

( * ) Notice: Subject to any disclaimer, the term of this patent is extended or adjusted under 35 U.S.C. 154(b) by 0 days.

(21) Appl. No.: 10/190,014

(22) Filed: Jul. 8, 2002

(65) Prior Publication Data

US 2003/0094145 A1 May 22, 2003

(30) Foreign Application Priority Data

Nov. 16, 2001 (TW) .................................... 90219962 U

(51) Int. Cl.[7] .............................................. A01K 27/00
(52) U.S. Cl. ........................ 119/859; 119/863; 362/108
(58) Field of Search ................................ 119/859, 863; 362/570, 577, 108

(56) References Cited

U.S. PATENT DOCUMENTS

| | | | | |
|---|---|---|---|---|
| 3,944,803 A | * | 3/1976 | Chao | 362/108 |
| 4,480,293 A | * | 10/1984 | Wells | 362/108 |
| 5,370,082 A | * | 12/1994 | Wade | 119/859 |
| 5,523,927 A | * | 6/1996 | Gokey | 362/103 |
| 5,575,554 A | * | 11/1996 | Guritz | 362/103 |
| 5,630,382 A | * | 5/1997 | Barbera et al. | 119/859 |
| 5,950,571 A | * | 9/1999 | Schade | 119/859 |
| 6,055,942 A | * | 5/2000 | Romanak et al. | 119/859 |
| 6,193,385 B1 | * | 2/2001 | Maki et al. | 362/108 |
| 6,557,498 B1 | * | 5/2003 | Smierciak et al. | 119/858 |

* cited by examiner

Primary Examiner—Teri P. Luu
Assistant Examiner—Susan C. Alimenti
(74) Attorney, Agent, or Firm—W. Wayne Liauii

(57) ABSTRACT

A pet collar comprises a strip body, a protective piece, an integrated circuit control board, a printed circuit piece, and a housing. The protective piece is either pervious the light or capable of reflecting light emitted by a motor vehicle of the like. The protective piece is attached to the outer side of the strip body by sewing so as to form a pocket in which the printed circuit piece is contained. The printed circuit piece is provided with a plurality of LED bulbs and is connected to the integrated circuit control board which is fastened with the strip body in conjunction with the housing.

5 Claims, 6 Drawing Sheets

PET COLLAR

FIELD OF THE INVENTION

The present invention relates to a pet collar capable of reflecting and emitting light to alert the operator of a motor vehicle the presence of the pet in a poorly-lit place, or at the time of poor visibility.

BACKGROUND OF THE INVENTION

As shown in FIG. 1, a prior art pet collar has a strip 1 of cloth or leather. The strip 1 is provided in the outer longitudinal side with a light-reflecting piece 2. In light of the light-reflecting piece 2 being small, the warning effect of the prior art pet collar is relatively poor.

As shown in FIG. 2, another prior art pet collar comprises a flexible tube 3 in which a plurality of light-emitting bodies 4 are disposed in conjunction with a wiring 5. The flexible tube 3 is pervious to light and is provided at one end with a head 6 in which a control board is housed. A retaining hook 7 is attached to the head 6. This prior art pet collar is not cost-effective. In addition, the flexible tube 3 and the head 6 of the pet collar cause discomfort to a pet when the collar is worn around the neck of the pet.

SUMMARY OF THE INVENTION

The primary objective of the present invention is to provide a pet collar free of the deficiencies of the prior art pet collars described above.

In keeping with the principle of the present invention, the foregoing objective of the present invention is attained by a pet collar comprising a strip, a light-reflecting film, an integrated circuit control board, and a flexible printed circuit piece disposed between the strip and the light-reflecting film.

The features and the advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
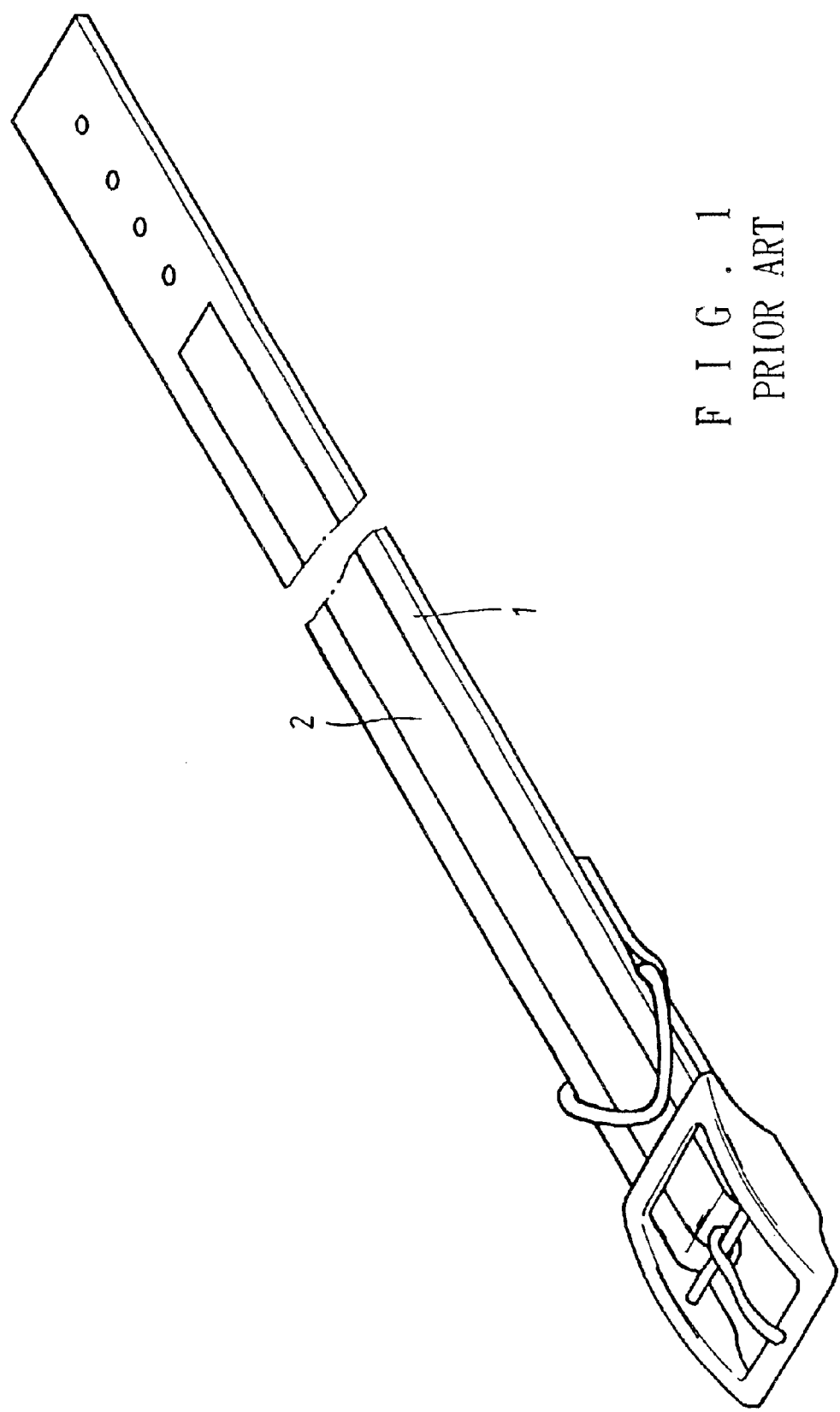
FIG. 1 shows a schematic view of a prior art pet collar.
Figure 2:
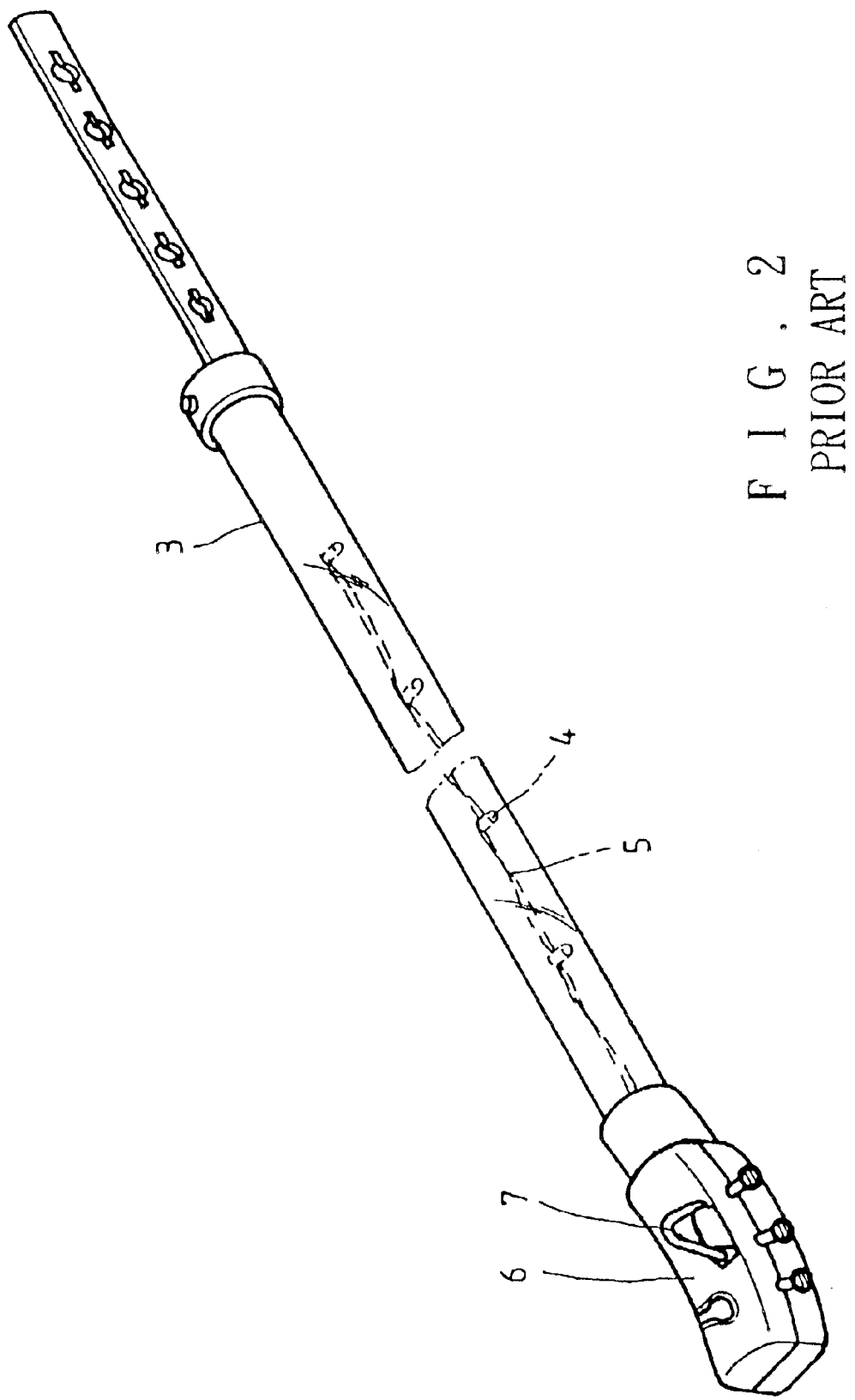
FIG. 2 shows a schematic view of another prior art pet collar.
Figure 3:
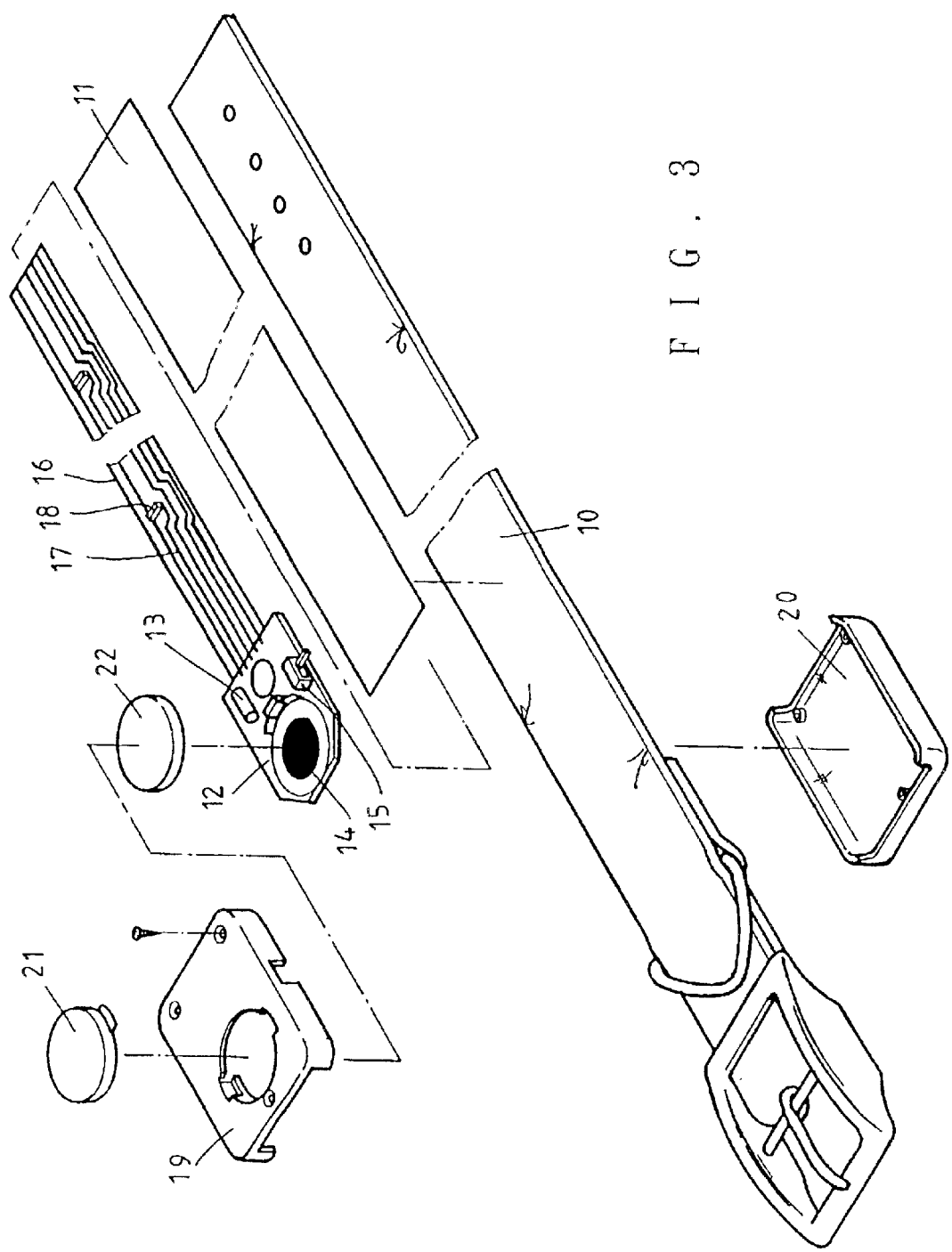
FIG. 3 shows an exploded view of the preferred embodiment of the present invention.
Figure 4:
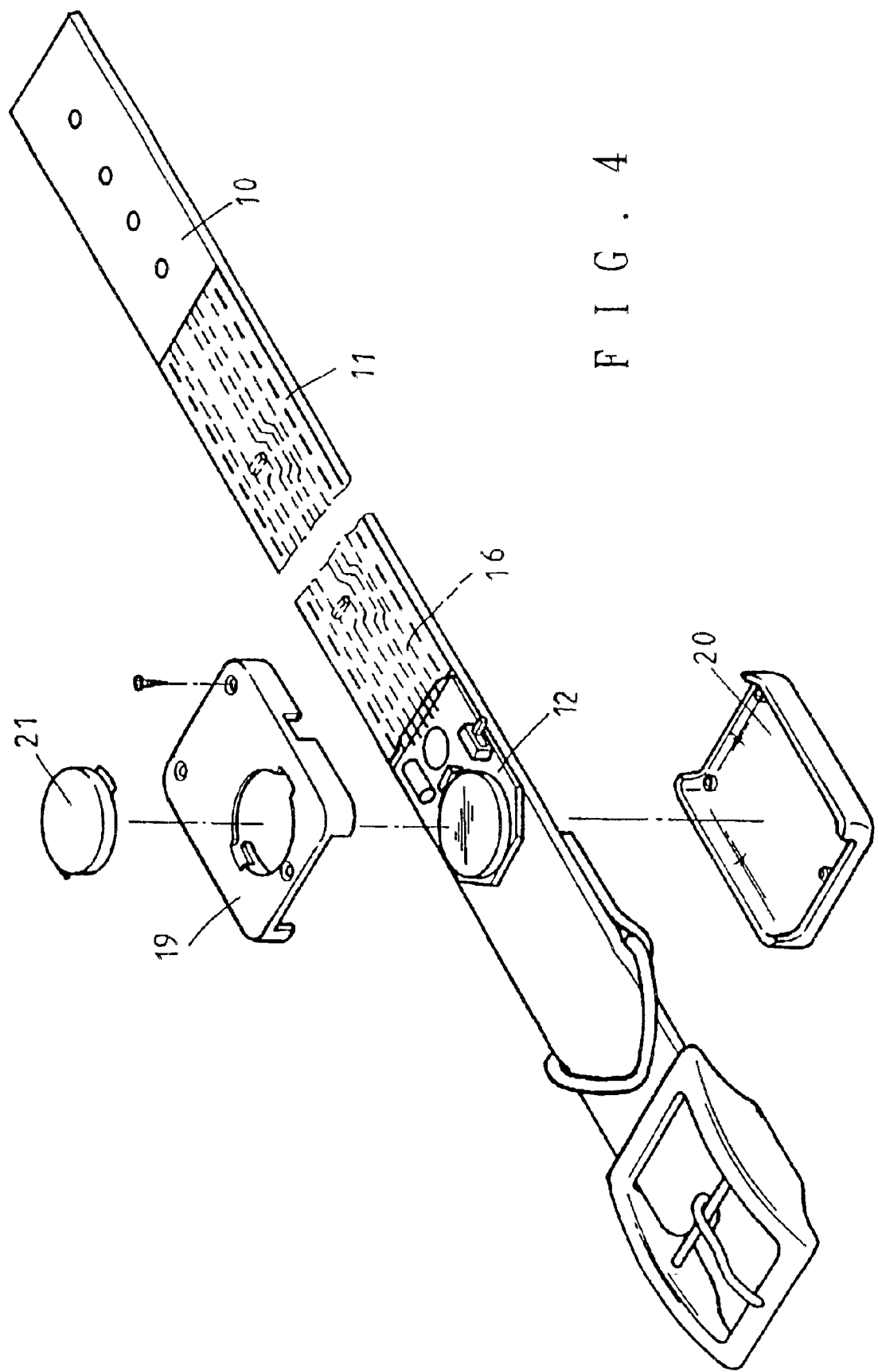
FIG. 4 shows a schematic view of assembly of the preferred embodiment of the present invention.
Figure 5:
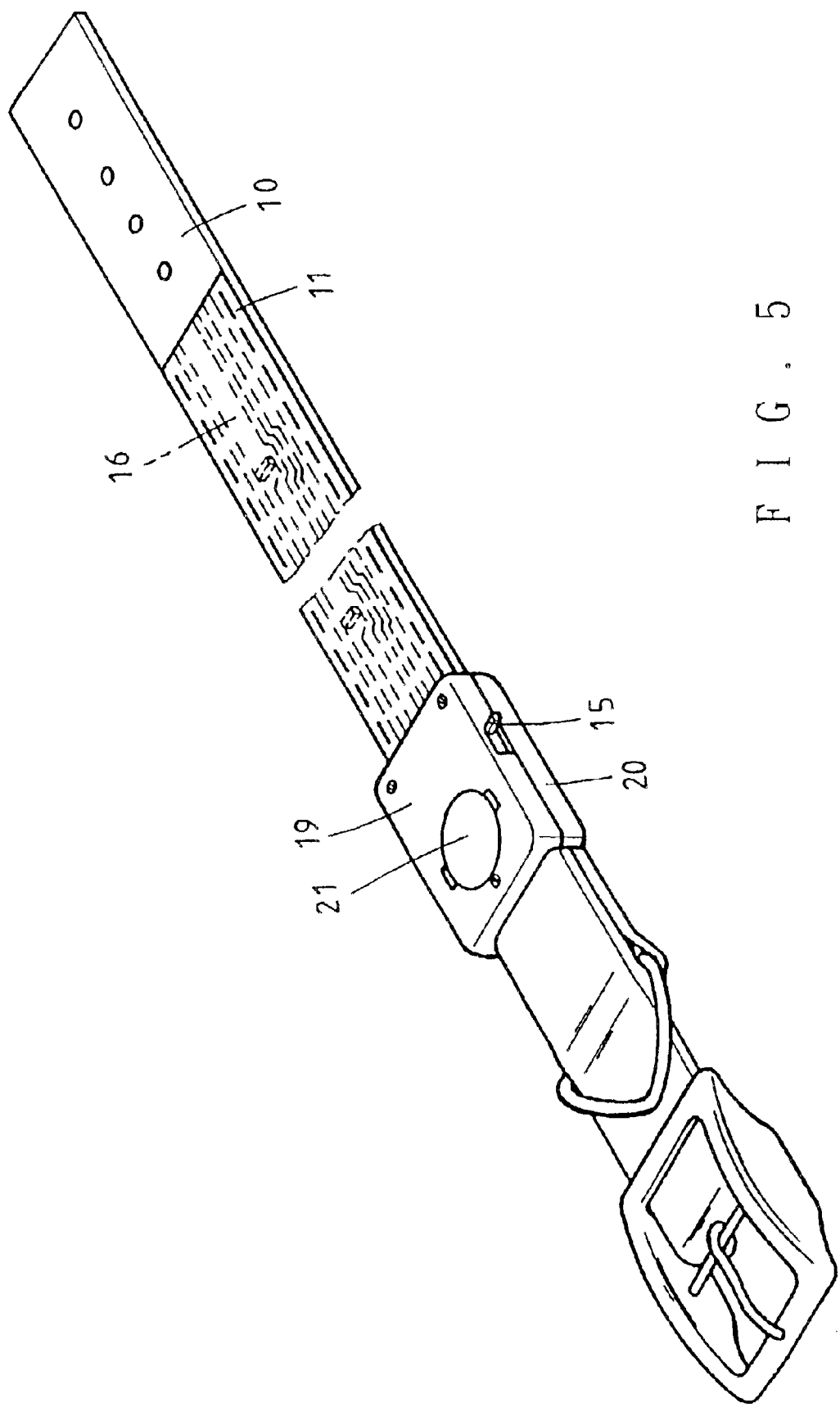
FIG. 5 shows a perspective view of the preferred embodiment of the present invention.

As shown in FIGS. 3–6, a pet collar embodied in the present invention comprises a strip body 10, a light-reflecting piece 11, an integrated circuit (IC) control board 12, and a pliable printed circuit piece 16 which is connected with the IC control board 12 and sandwiched between the strip body 10 and the light-reflecting piece 11.

The light-reflecting piece 11 is attached to the strip body 10 by sewing such that a pocket is formed to contain the pliable printed circuit piece 16, which is connected at one end with the IC control board 12. The IC control board 12 is provided with a plurality of electronic control elements 13, a battery mount 14, and an ON-OFF switch 15. The pliable printed circuit piece 16 is provided with a printed circuit 17 and a plurality of miniaturized light-emitting diode (LED) bulbs 18.

The IC control board 12 is housed in a housing which is formed of an outer piece 19 and an inner piece 20. The IC control board 12 is mounted on an outer side of the strip body 10. The outer piece 19 is provided with a battery window 21 corresponding in location to the battery mount 14. A battery 22 is mounted on the battery mount 14 such that the battery 22 can be easily reached through the battery window 21 of the outer piece 19.

Figure 6:
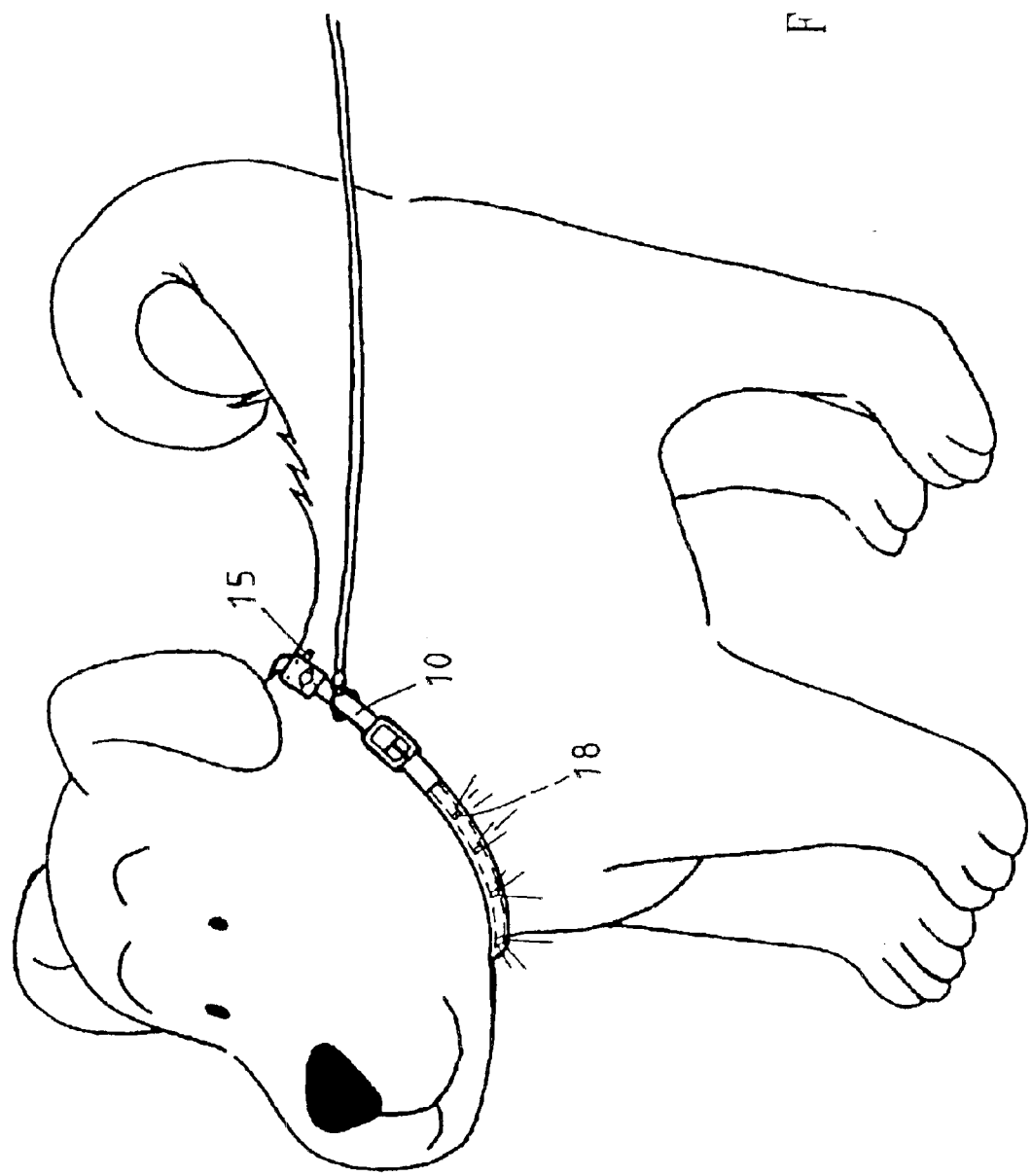
FIG. 6 shows a schematic view of the preferred embodiment of the present invention at work.

As shown in FIG. 6, the pet collar of the preferred embodiment of the present invention is worn around the neck of a pet dog. When the switch 15 is turned on, the LED bulbs 18 give off light. When the switch 15 is turned is turned off, the light-reflecting piece 11 is at work to reflect the light which is emitted by a motor vehicle of the like. In addition, the light-reflecting piece 11 serves as a shield to protect the printed circuit piece 16 which is contained in the pocket formed by the light-reflecting piece 11 and the outer side of the strip body 10. The light-reflecting piece 11 is pervious to light emitted by the LED bulbs 18 of the printed circuit piece 16. It must be noted here that the pet collar of the present invention is worn around the neck of a pet such that the inner side of the strip body 10 comes in contact with the neck of the pet.

The embodiment of the present invention described above is to be regarded in all respects as being illustrative and nonrestrictive. Accordingly, the present invention may be embodied in other specific forms without deviating from the spirit thereof. For example, the light-reflecting piece 11 may be replaced by a protective piece which is pervious to light and is incapable of reflecting light emitted by a motor vehicle or the like. The present invention is therefore to be limited only by the scopes of the following claims.

What is claimed is:

1. A pet collar with light emitting means, comprising:
   a strip body, which forms said pet collar without any light emitting means;
   a protective piece attached to an outer side of said strip body such that said protective piece and the outer side of said strip body form a pocket wherein said protective piece is pervious to light;
   a printed circuit piece detachably contained in said pocket, said printed circuit piece being provided with a plurality of light-emitting diode bulbs;
   an integrated circuit control board connected to one end of said printed circuit piece; and
   a two-piece housing which is fastened to said strip body for encasing both said integrated circuit control board and a portion of said strip body associated with said integrated circuit control board, said two-piece housing comprises an outer piece and an inner piece, and said outer piece being fastened to said inner piece to fix said integrated circuit control board onto said strip body wherein said housing is provided with a battery window to facilitate the replacing of a battery.

2. The pet collar as defined in claim 1, wherein said protective piece is capable of reflecting light emitted by a motor vehicle.

3. The pet collar as defined in claim 1, wherein said light-emitting diode bulbs of said printed circuit piece are connected by printed circuits.

4. The pet collar as defined in claim 1, wherein said integrated circuit control board is provided with a battery mount and an ON-OFF switch.

5. A pet collar with light emitting means, comprising:
- a strip body;
- a light transmitting protective piece attached to an outer side of said strip body such that said protective piece and the outer side of said strip body form a pocket;
- a printed circuit piece detachably contained in said pocket
- a plurality of light-emitting diode bulbs provided on said printed circuit piece;
- an integrated circuit control board connected to a first end of said printed circuit piece; and
- a two-piece housing fastened to said strip body to encase both said integrated circuit control board and a portion of said strip body associated with said integrated circuit control board;

wherein said two-piece housing comprises an outer piece and an inner piece, and a fastening means to fasten said outer piece and said inner piece together and fix said integrated circuit control board onto said strip body wherein said housing is provided with a battery window to facilitate the replacing of a battery.

\* \* \* \* \*